United States Patent [19]
Levine
[11] Patent Number: 4,598,982
[45] Date of Patent: Jul. 8, 1986

[54] APPARATUS FOR EXTENDING REAR VIEW MIRROR

[76] Inventor: Leonard Levine, 2978 Beechwood Blvd., Pittsburgh, Pa. 15217

[21] Appl. No.: 667,828
[22] Filed: Nov. 2, 1984
[51] Int. Cl.[4] .......................... G02B 5/08; G02B 7/18
[52] U.S. Cl. .................................. 350/626; 350/632; 350/639
[58] Field of Search ........................ 350/626, 632, 639

[56] References Cited

U.S. PATENT DOCUMENTS 2,895,380 7/1959 Kurlytis .............................. 350/626

FOREIGN PATENT DOCUMENTS 2108953 8/1972 Fed. Rep. of Germany ...... 350/626
2845446 4/1980 Fed. Rep. of Germany ...... 350/626
1416590 9/1965 France ................................ 350/626

*Primary Examiner*—John K. Corbin
*Assistant Examiner*—Richard F. Gallivan
*Attorney, Agent, or Firm*—Alan Ruderman

[57] ABSTRACT

An extendible mirror bracket housing is fastened onto the rear view mirror in the interior of a motor vehicle. The bracket housing slidably carries a bracket within an elongated channel formed in the housing. An extension mirror is pivotably fastened by a hinge to the bracket and may be extracted from the channel. Stop members preclude extraction of the bracket member from the channel. An additional extension mirror may be provided at the rear of the first mentioned extension mirror.

9 Claims, 6 Drawing Figures 4 28 18 42 36 38 39 40 46 44 28

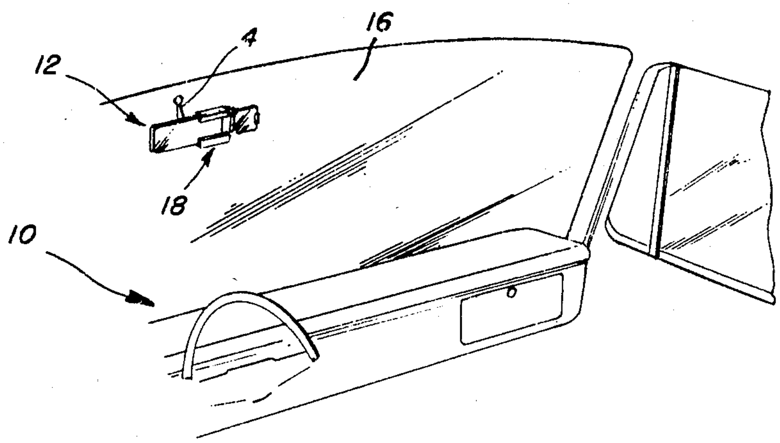
FIG. 1
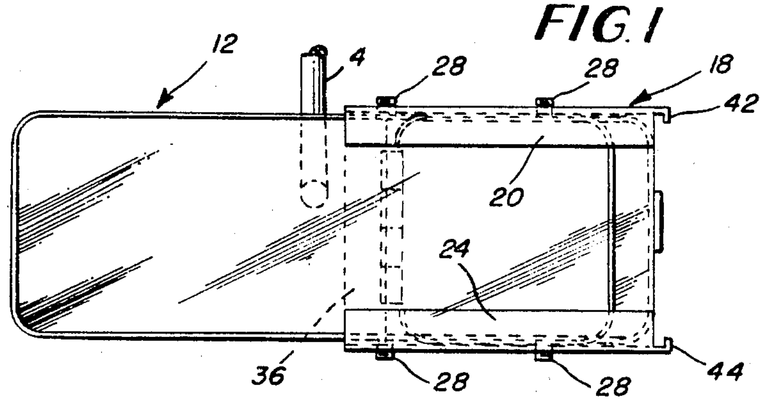
FIG. 2
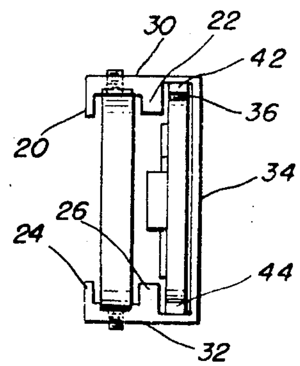
FIG. 3
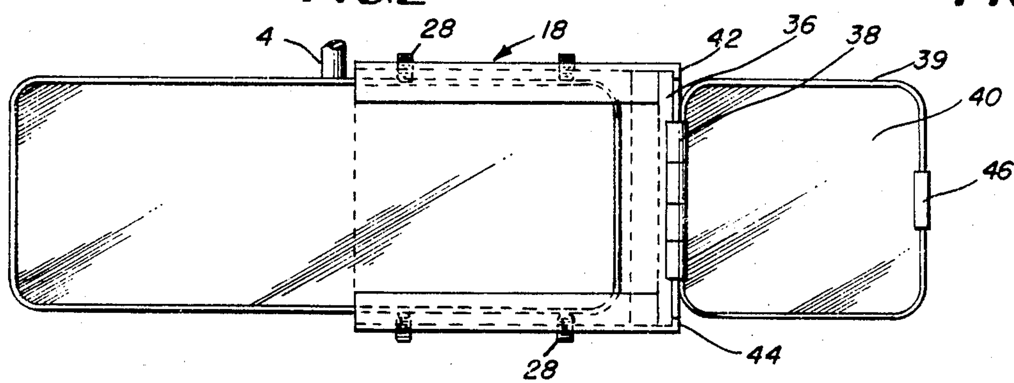
FIG. 4
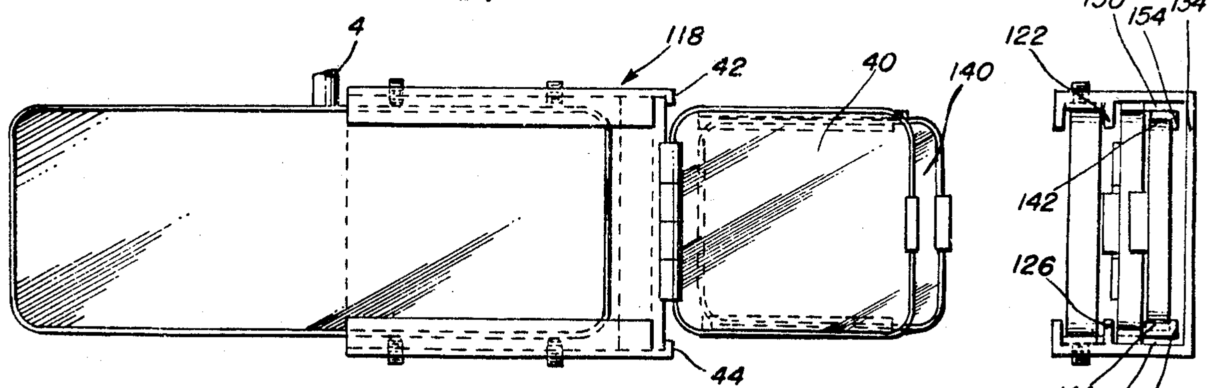
FIG. 5
FIG. 6

APPARATUS FOR EXTENDING REAR VIEW MIRROR

BACKGROUND OF THE INVENTION

This invention relates to interior rear view mirrors for motor vehicles and more particularly to apparatus for providing an extension of the rear view mirror of most automobiles and for permitting a wide angle angular view of the rear and sides of the vehicle.

Although some vehicles have exterior mirrors on the side thereof remote from the side on which the driver sits, most automobiles, and especially older models, still have only an interior rear view mirror and a single exterior mirror, the latter being on the driver's side of the vehicle. With this arrangement there exists a "blind spot" over an area which may comprise a substantial portion of the view on the exterior side of the vehicle remote from the driver, i.e., the right side as considered from the seated position of the driver. Such blind spots normally result in the driver turning to look out the rear of the right side of the vehicle, but for some drivers this may be a painful exercise, and can be dangerous when the driver looks away from the forward direction in which the vehicle travels. Depending on the configuration of the vehicle, the position of the driver's seat and the size of the driver, this area over which the driver has no visual perception may be substantial and could result in a safety hazard.

SUMMARY OF THE INVENTION

Consequently, it is a primary object of the present invention to provide an extension for the interior rear view mirror of motor vehicles.

It is another object of the present invention to provide an extendible mirror bracket housing adapted to be attached to the rear view mirror of an automobile, the bracket housing carrying at least one mirror slidable relatively thereto for extending the effective viewing area.

It is a further object of the present invention to provide an extendible mirror bracket housing adapted to be attached to the rear view mirror of an automobile, the bracket housing slidably carrying at least one mirror pivotably supported on a bracket in a channel of the bracket housing for adjustably extending the effective viewing capacity of a driver of the vehicle.

Accordingly, the present invention provides an extendible mirror bracket housing adapted to be fastened to the rear view mirror in the interior of a motor vehicle, the bracket housing carrying within a channel thereof at least one slidable extension mirror which may be partially or fully extracted selectively from the channel to provide a greatly enlarged reflecting surface for viewing by the driver of the vehicle. The extension mirror is hingedly attached to a bracket slidable in the channel and when the extension mirror is fully extracted from the bracket housing the mirror may be pivoted to adjust the extension mirror for proper viewing of the right side of the vehicle by the driver. Another aspect of the invention is an additional extension mirror which may be extended relatively to the rear view mirror and to the first extension mirror for providing a very large view of the rear and right side of the vehicle.

BRIEF DESCRIPTION OF THE DRAWINGS

The particular features and advantages of the invention as well as other objects will become apparent from the following description taken in connection with the accompanying drawings, in which:

FIG. 1 is a perspective view of the interior of a motor vehicle illustrating the rear view mirror incorporating an extendible mirror bracket housing constructed in accordance with the principles of the present invention and depicting an extension mirror in the extracted position;

FIG. 2 is an enlarged front elevational view of the rear view mirror and bracket housing of FIG. 1, but with the extension mirror in the retracted position;

FIG. 3 is an end elevational view thereof as viewed from the right end of FIG. 2;

FIG. 4 is a view similar to FIG. 2, but with the extension mirror in the fully extended position;

FIG. 5 is a view similar to FIG. 4, but illustrating a second embodiment of the invention incorporating two extension mirrors; and FIG. 6 is an end elevational view of the embodiment illustrated in FIG. 5.

DESCRIPTION OF THE PREFERRED EMBODIMENTS

Referring now to the drawings, FIG. 1 illustrates the interior of an automobile 10 having a conventional rear view mirror 12 mounted at the front thereof by means of an arm 14 secured to or above the front windshield 16 as is conventional. An extendible mirror bracket housing 18 constructed in accordance with the present invention is fastened to and carried by the rear view mirror 12 as hereinafter described.

The bracket housing 18 comprises a substantially rectangular member having a pair of spaced ledges 20, 22 at the top thereof and a pair of spaced ledges 24, 26 at the bottom thereof extending the length thereof. The ledges 20 and 24 are at the front of the bracket 18 facing the interior of the vehicle, i.e., the rear of the vehicle, and the ledges 22, 26 are in the interior of the bracket housing spaced from the respective ledge 20, 24 by an amount sufficient for slidably receiving the rear view mirror 12 in the channel formed therebetween. Set screws 28 or the like threaded into the top and bottom surfaces 30, 32 respectively of the bracket housing 18 secures the bracket housing 18 to the rear view mirror 12.

The bracket housing 18 has a rear wall 34 which is spaced from the ledges 22, 26 by an amount sufficient for receiving a slidable bracket 36, the bracket 36 being disposed for sliding lengthwise in the bracket housing 18 in the channel formed between the ledges 22, 26 and the rear wall 34. Pivotably secured by a hinge 38 to the edge of the right end of the bracket 36, i.e., the edge facing the direction towards which the bracket may be extended from its retracted position, is the frame 39 of an extension mirror 40 having a rectangular configuration adapted to be received within the channel in which the bracket 36 slides. The right end of the bracket housing 18 at the top and bottom thereof has a respective lip 42, 44, the upper lip 42 extending downwardly and the lower lip 44 extending upwardly so as to preclude the bracket 36 from being withdrawn from the bracket housing so as to provide a stop for the bracket 36 when the extension mirror 40 is fully extracted. The mirror 40 and its frame 39 are shorter in height than the bracket 36 and the lips 42, 44 are spaced apart slightly more than the height of the mirror for permitting the mirror to pass outwardly therebetween while closing passage of the bracket 36 therethrough. A finger tab 46 at the end of the mirror frame remote from the hinge 38 may be grasped to extend or retract the extension mirror 40.

In operation the driver may extend the mirror 40 from the storage channel between the ledges 20, 22 and 24, 26 by any desired amount and when fully extracted the mirror 40 may be pivoted to adjust the angle of the mirror 40 relative to the mirror 12 for providing a selective view of the right side and rear of the vehicle.

To provide an even greater panoramic view an additional extension mirror may be provided. Thus, in the embodiment illustrated in FIGS. 5 and 6, there is provided a second extension mirror 140 which is slidably extendible relative to a bracket housing 118 and to the first mirror 40. The housing 118 in FIGS. 5 and 6 is slightly modified relative to the housing 18 illustrated in FIGS. 2 through 4 by increasing the spacing between the rear wall 134 and the ledges 122, 126 for inclusion of both extension mirrors 40, 140. At the rear of the mirror 40 the frame in which it is disposed may have rearwardly extending rails 150, 152 terminating in lips 154, 156 which define a channel at the rear of the mirror 40 for providing a slideway for the mirror 140. Downwardly and upwardly extending lips 142, 144 similar to the lips 42, 44 may be provided on the rails 150; 152 to provide a stop for precluding the mirror 140 from being totally withdrawn from the slideway in the rear of the mirror 40. This embodiment is utilized in the same manner as the first embodiment but provides an increased viewing surface.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for extending the viewing area of a rear view mirror supported in the interior of a motor vehicle, said rear view mirror comprising a substantially rectangular body, said apparatus comprising a substantially rectangular bracket housing, said housing including an elongated open front channel extending the length thereof, said channel being of a rectangular configuration for receiving a portion of said rear view mirror, adjustable fastening means extending into the channel for abutting edges of said portion of the rear view mirror for securing said bracket housing to the rear view mirror, said housing comprising at least a second elongated channel extending therethrough substantially parallel to said open front channel, a bracket member slidably disposed in said second channel for movement relative to said rear view mirror, an extension mirror, means for fastening said extension mirror to said bracket member for movement therewith, and stop means at an end of said second channel remote from said rear view mirror for abutting said bracket to preclude withdrawal of said bracket from said second channel while permitting said extension mirror to be extracted selectively from said end of said second channel.

2. Apparatus as recited in claim 1, wherein said means for fastening said extension mirror on said bracket comprises hinge means, whereby said extension mirror may pivot relative to said bracket and to said rear view mirror.

3. Apparatus as recited in claim 2, wherein said open front channel comprises a pair of spaced apart ledges depending downwardly from an upper surface of said bracket housing and a pair of spaced apart ledges extending upwardly from a bottom surface of said bracket housing, said downwardly depending ledges forming the upper border of said channel, and the upwardly extending ledges forming the lower border of said channel, one of the downwardly depending ledges and one of the upwardly extending ledges being at the front of said housing and the other ledges being in the interior thereof, at least the ledges at the front of the housing being spaced one from the other for permitting a substantial amount of said portion of the rear view mirror to be visible from the front of the housing.

4. Apparatus as recited in claim 3, wherein said second channel is defined between the ledges at the interior of said housing and a rear wall of said housing.

5. Apparatus as recited in claim 3, wherein said extension mirror includes means for slidably carrying a second extension mirror for movement relative to said first mirror and to said housing.

6. Apparatus as recited in claim 3, wherein said stop means comprises a pair of lips at said one end of said channel, one of said lips extending downwardly and the other of said lips extending upwardly, said lips being spaced apart a distance greater than the height of said extension mirror but less than said bracket.

7. Apparatus as recited in claim 6, wherein said fastening means comprises threaded members extending through the upper and lower walls of said housing for abutting said rear view mirror.

8. Apparatus as recited in claim 7, wherein said second channel is defined between the ledges at the interior of said housing and a rear wall of said housing.

9. Apparatus as recited in claim 7, wherein said extension mirror includes means for slidably carrying a second extension mirror for movement relative to said first mirror and to said housing.

* * * * *